(12) United States Patent  (10) Patent No.: US 7,121,100 B2
Atkey et al.  (45) Date of Patent: Oct. 17, 2006

(54) HIGH EFFICIENCY AIRCRAFT CABIN AIR SUPPLY COOLING SYSTEM

(75) Inventors: Warren A. Atkey, Bothell, WA (US); Charles J. Fiterman, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 10/658,001

(22) Filed: Sep. 9, 2003

(65) Prior Publication Data

US 2005/0051668 A1   Mar. 10, 2005

(51) Int. Cl.
F25B 9/00 (2006.01)
F25D 9/00 (2006.01)

(52) U.S. Cl. ............................. 62/86; 62/172; 62/401; 62/402

(58) Field of Classification Search ................ 62/401, 62/402, 86, 172
See application file for complete search history.

(56) References Cited

U.S. PATENT DOCUMENTS

| | | | |
|---|---|---|---|
| 2,582,848 A | 1/1952 | Price | |
| 2,767,562 A | 10/1956 | Hall | |
| 3,169,466 A | 2/1965 | Cramer | |
| 3,187,768 A | 6/1965 | Waterfall | |
| 3,208,234 A * | 9/1965 | Messinger | 62/172 |
| 3,537,510 A | 11/1970 | Rannenberg et al. | |
| 3,577,902 A | 5/1971 | Garnder | |
| 4,014,179 A | 3/1977 | Iles et al. | |
| 4,175,583 A | 11/1979 | Finkelstein et al. | |
| 4,187,090 A | 2/1980 | Bizzarro et al. | |
| 4,209,993 A | 7/1980 | Rannenberg | |
| 4,301,833 A | 11/1981 | Donald, III | |
| 4,399,665 A | 8/1983 | Evans et al. | |
| 4,430,867 A | 2/1984 | Warner | |
| 4,445,342 A | 5/1984 | Warner | |
| 4,462,561 A | 7/1984 | Cronin | |
| RE32,100 E | 4/1986 | Rannenberg | |
| 4,681,610 A | 7/1987 | Warner | |
| 4,966,005 A * | 10/1990 | Cowell et al. | 62/79 |
| 4,993,886 A | 2/1991 | Hofstetter | |
| 5,516,330 A | 5/1996 | Dechow et al. | |
| 5,545,084 A | 8/1996 | Fischer et al. | |
| 5,704,218 A | 1/1998 | Christians et al. | |
| 6,449,961 B1 | 9/2002 | Korsgaard | |
| 6,615,606 B1 * | 9/2003 | Zywiak | 62/402 |

* cited by examiner

*Primary Examiner*—William C. Doerrler
(74) *Attorney, Agent, or Firm*—Harness, Dickey & Pierce P.L.C.

(57) ABSTRACT

A thermal management system for an aircraft is provided. The aircraft includes a primary air conditioning system which compresses and cools outside air to create inside air. The inside air pressurizes the internal volume of the aircraft and ventilates a first object in the internal volume. An exhaust exhausts a portion of the inside air to allow more outside air to be drawn into the aircraft. A cooler cools a coolant which in turn controls temperature of at least two objects in the internal volume.

20 Claims, 8 Drawing Sheets

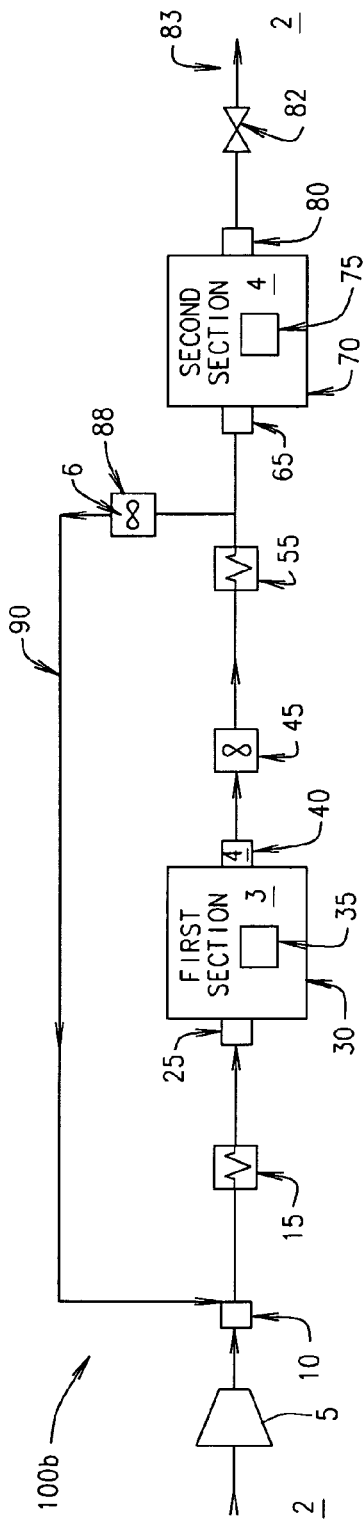
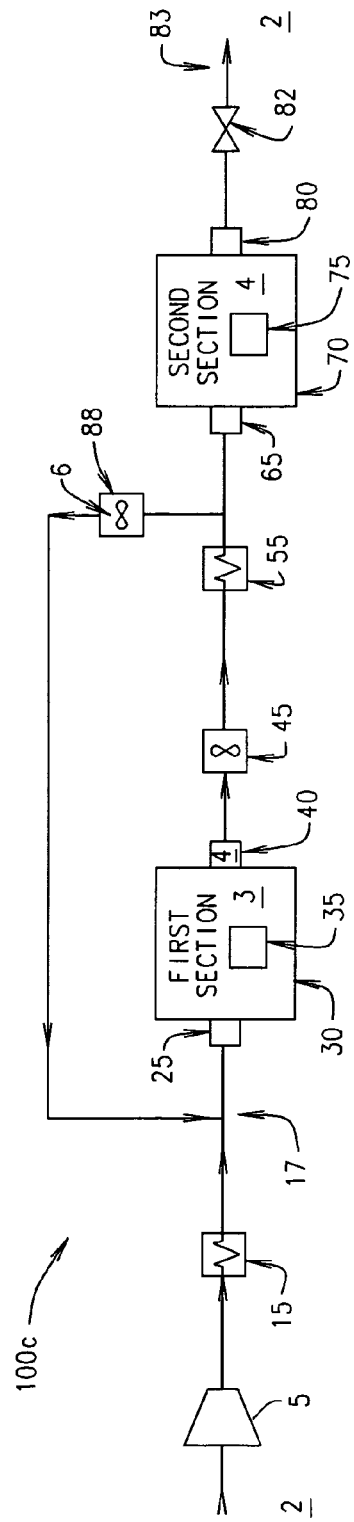

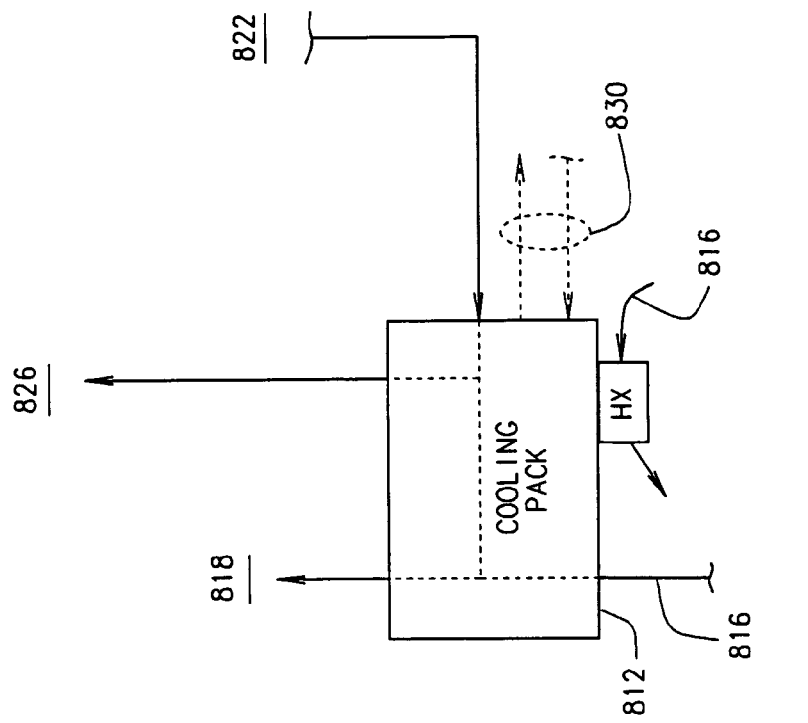
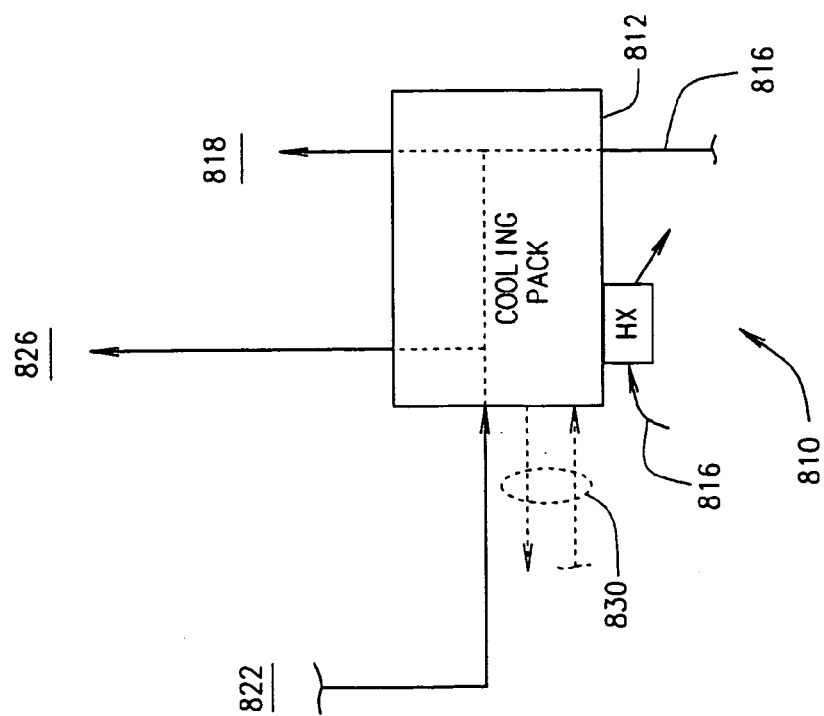
FIG. 9

HIGH EFFICIENCY AIRCRAFT CABIN AIR SUPPLY COOLING SYSTEM

FIELD OF THE INVENTION

The present invention relates to a system to efficiently condition air to be supplied to the interior of an aircraft, and more particularly to a system to save energy by reducing the need for outside air.

BACKGROUND OF THE INVENTION

It is necessary on large, modern aircraft to ventilate the interior of the aircraft and to provide temperature control. Some examples of these uses include:
a) Cabin, flight deck, crew rest, lavatory, and galley ventilation and temperature control for crew and passengers
b) Flow to clear smoke from the flight deck
c) Flow to prevent lower lobe smoke from penetrating into the cabin or flight deck
d) Cargo compartment ventilation and temperature control for animals and perishables
e) Equipment cooling Traditionally, outside air (also known as pack air or conditioned air) has been the primary means of meeting the various aircraft air conditioning requirements. From the outside, the air is typically brought in via an engine, or an Auxiliary Power Unit (APU), bleed air extraction and one or more downstream air conditioning packs. A significant amount of energy is required to bring outside air into a pressurized aircraft during cruise where ambient pressures are low. In the case of the use of engine bleed air, the prior art systems typically elevate the air to pressures far beyond the needs of the cabin, thereby disadvantageously consuming enormous quantities of energy.

Once pressurized, this outside air is conditioned by the air conditioning packs to control the temperature of the cabin, flight deck, and in some cases the cargo bay. The larger the heat loads in these areas, the colder the temperature of, or the greater the flow rate of, the air that must be supplied. Consequently the prior art systems require (depending on the system employed) more energy, air conditioning equipment weight and (or) ram air usage drag to accommodate the larger heat loads.

For instance, one prior art system includes a cooling pack and a mixing manifold. Outside air is fed from a source of compressed outside air, such as an auxiliary power unit driven compressor or the main engine compressor, into an outside air line. The air line directs the air to the cooling pack which cools the outside air below the lowest temperature required by the air conditioning demands. Thus the air conditioning pack also removes the waste heat introduced into the air by the compression to, or above, cabin pressure. Note, also that the Bleed Air System may remove heat upstream of the air conditioning pack. From the air conditioning pack, another air line directs the compressed, cooled, outside air to a mixing manifold. In the meantime, air inside the aircraft is being warmed by heat loads and is concurrently entraining humidity.

Previously employed solutions also use a recirculation fan to collect the inside air and to feed the resulting recirculation air to a recirculation line. The recirculation line then directs the recirculation air back to the mixing manifold. Within the mixing manifold, the recirculation air and the cool, compressed, outside air mix to form inside air once again. Another air line directs the inside air flowing from the mixing manifold to the interior of the aircraft. In particular, the previously developed systems feed the inside air to all interior sections of the aircraft in parallel.

Unfortunately, as noted, the outside air surrounds the aircraft at low pressure during long distance cruise. The low pressure of the outside air imposes the burden of compressing the outside air as it is drawn into the aircraft. That compression burden adds to the need for large, heavy, energy consuming equipment onboard the aircraft where space, weight, and energy are at a premium.

Another solution entails bleeding off high pressure air from sources readily available onboard, for instance using engine bleed air. However, such sources elevate the pressure of the bleed air well above that needed for inside air. If the amount of air being compressed could be reduced, the associated energy could be more beneficially employed to propel the aircraft. In the alternative, the size or fuel consumption of the engine could be reduced.

Prior art air conditioning systems have also attempted to provide a relatively constant volumetric flow to the cabin for ventilation and cooling. Typically, the nominal, cruise, outside air, inflow rates are well above the FAR/JAR (Federal Aviation Regulations and Joint Aviation Requirements) requirements associated with cabin, flight deck, crew rest, lavatory, and galley ventilation and temperature control for crew and passengers. Moreover, the government has recently made the regulatory requirements related to maintaining the cabin and crew compartments below temperature and humidity thresholds more stringent. To meet these regulations and to address reliability concerns, backup ventilation systems have been implemented in some recent aircraft designs, thereby adding to the weight and complexity of the aircraft.

Moreover, even when the outside air is at sea level atmospheric pressure (e.g. the aircraft has landed), the outside air must still be drawn into the aircraft and cooled to provide cabin temperature control. To do so still requires running an engine or auxiliary power unit. Either of which creates noise and pollutants at airports where both noise and pollutants must be controlled. Nor is providing the outside air from ground support equipment desirable as this solution requires additional mechanical equipment in the crowded area of the terminal. In some cases the added equipment also produces noise and pollutants.

Thus, it would be desirable to reduce the need for outside air to provide onboard air conditioning.

SUMMARY OF THE INVENTION

The present invention is directed to a system for conditioning coolants for use in internal temperature control of an aircraft, more particularly to saving energy while still meeting the various air conditioning needs of the aircraft.

Given the disadvantages of the prior art, a major goal of maximizing aircraft level energy efficiency should be to minimize the amount of outside air needed, while also minimizing aircraft internal heat loads on the air conditioning system. The present invention provides air conditioning system architectures which address these goals. Furthermore, the present invention provides an aircraft air conditioning, refrigerating, ventilation, and supplemental equipment cooling architecture that seeks to maximize aircraft level energy efficiency by minimizing power extraction, weight, and drag. In particular, the present invention satisfies the temperature control requirements of the aircraft separately from the ventilation requirements. By doing so, the present invention allows for satisfaction of the temperature control needs independently of the need to draw in and compress outside air.

In one preferred embodiment, a thermal management system for an aircraft is provided. The aircraft includes a primary air conditioning system which compresses and cools outside air to create inside air. The inside air pressurizes the internal volume of the aircraft and ventilates a first object in the internal volume. An exhaust exhausts a portion of the inside air to allow more outside air to be drawn into the aircraft. A cooler cools a coolant which in turn controls the temperature of a plurality of objects in the internal volume.

A second preferred embodiment provides an aircraft with an internal volume containing a plurality of heat loads. A compressor compresses outside air with a cooler cooling the compressed outside air to create inside air. The inside air pressurizes the volume. In addition a centralized thermal management system provides a fluid to the plurality of heat loads to control the temperature of the heat loads.

A third preferred embodiment provides a method of managing thermal loads on an aircraft is provided. The method includes compressing and cooling a first quantity of outside air to form inside air. A portion of the inside air is exhausted to allow more outside air to be drawn into the aircraft. A first object in the pressurized volume is ventilated with the inside air. A fluid is cooled and used to cool a second object in the pressurized volume whereby energy is saved over compressing more outside air to cool the second object.

A fourth preferred embodiment of the present invention includes a method of designing an air conditioning system for an aircraft which has different air conditioning requirements associated with two objects. The method applies to the design of such systems where the requirement for one of the objects is more stringent than the requirement for the other object. According to one preferred implementation of the method, an outside air conditioning pack is sized to cool the object with the more stringent requirement. A supplemental cooling unit is also sized to provide re-cooled air to the other object with the sizing of the supplemental cooling unit being based on the heat absorbed from the object with the more stringent requirement. Also, an outside air make up is sized to make up air which is exhausted from the aircraft. The sizing of the outside air make up is based on the availability of the supplemental cooling unit which reduces the need for make up air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2 to 4 are schematic views of alternative embodiments of the system of FIG. 1;

FIG. 9 is a schematic view of an aircraft air conditioning system according to a preferred embodiment of the present invention;

DETAILED DESCRIPTION OF THE PREFERRED EMBODIMENTS

Figure 1:
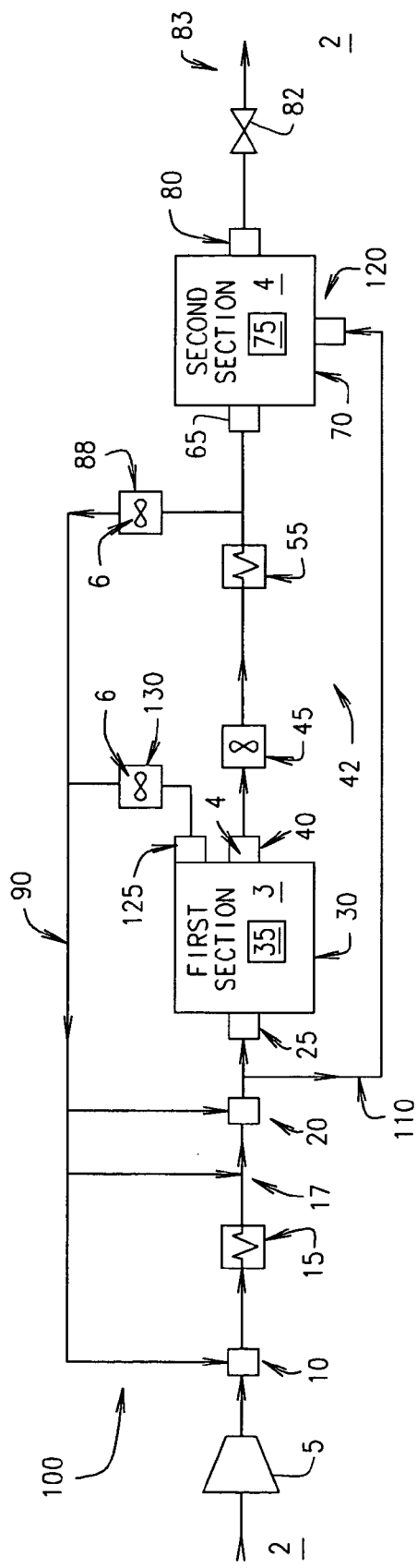
FIG. 1 is a schematic view of an aircraft air conditioning system according to a preferred embodiment of the present invention.

The following description of the preferred embodiment(s) is merely exemplary in nature and is in no way intended to limit the invention, its application, or uses.

As noted, modern aircraft use conditioned outside air for many different purposes within the pressurized volume of the aircraft. Some examples of these uses include:

a) Cabin, flight deck, crew rest, lavatory, and galley ventilation and temperature control for crew and passengers
b) Flow to clear smoke from the flight deck
c) Flow to prevent lower lobe smoke from penetrating into the cabin or flight deck
d) Cargo compartment ventilation and temperature control for animals and perishables
e) Equipment cooling While the prior art treated these air conditioning needs without regard to whether the need represents a ventilation need or a temperature control need, the present invention makes the difference between these types of needs explicit. Generally, air conditioning encompasses both ventilation and temperature control. Whereas ventilation refers to the replacement, refreshment, or HVAC related "turn over" of air. Temperature control, in contrast, refers to removing heat from, or in some cases supply heat to, an object which is not at thermal equilibrium with its environment.

As discussed earlier, a significant amount of energy is required to bring outside air into a pressurized aircraft. In light of this, the present invention reconsiders the use of outside air for various air conditioning needs. Federal Aviation Regulations (FARs) and Joint Aviation Requirements (JARs) associated with items a), b) and c) above either directly require the use of outside air, or indirectly tend to drive the use of outside air. However, no such requirement exists for items d) and e). Thus, the present invention offers an efficient means to satisfy the needs of items d) and e) without the use of outside air.

It should be noted that each pound per minute of outside air flow requires a great deal of power, system weight, size, and drag while at cruise. Cooling cabin recirculation air or another coolant instead of drawing in outside air thus reduces power, air conditioning equipment size, weight, and drag at the aircraft level. Accordingly, the present invention facilitates the use of recirculated cabin air or a chilled coolant (or both) as a substitute for compressed outside air.

Traditionally, higher cooling demands have resulted in more outside air use, higher primary air conditioning unit inlet pressures (in the case of air cycle systems), and more ram air use. System architectures in accordance with the present invention create independence from the need for a make up flow of outside air to satisfy the cooling function. By thus separating the cooling function from the need for outside air provides maximum flexibility to meet temperature control and ventilation needs independently. Reductions in aircraft level power, air conditioning equipment size, weight, and drag therefore flow from the present invention.

Moreover, in typical prior art systems, the nominal make up flow of outside air can be well above the FAR/JAR (Federal Aviation Regulations and Joint Aviation Requirements) requirements associated with item (a) above. Reducing the inflow rates to only that required by the item (a) FAR/JAR requirements, however, may not be acceptable because cabin temperature control demands may no longer be satisfied. The supplemental cooling packs, of the present invention, allow for independence of temperature control from the need to draw in and compress outside air when employed. Consequently, inflow rates can be reduced to the minimum FAR/JAR levels associated with item a) above without temperature control degradation. These reduced outside airflow rates will result in significant aircraft level power, air conditioning equipment size, weight, and drag savings.

Additionally, the unnecessary compression of the outside air consumes large quantities of energy, some of which manifests itself as a temperature increase in the compressed outside air. Since the temperature of the compressed, outside air typically far exceeds a temperature useful for ventilation and temperature control, the hot, compressed, outside air must be cooled prior to use in the aircraft. Thus necessitating the consumption of additional energy over that needed to merely compress the outside air.

Furthermore, the Auxiliary Power Unit (APU) is often used to enable air conditioning while the aircraft is parked at the gate and during ground maintenance. Using the APU at these locations creates undesirable noise and air pollutant emissions. The present invention allows for electrical power based aircraft air conditioning thereby reducing APU emissions and improving APU fuel consumption and life.

Needs such as cargo compartment ventilation for animals, plants, and perishables, and equipment cooling also exist. These needs, though, do not require the use of compressed outside air to meet the associated government regulations. Accordingly, the present invention facilitates the use of recirculated inside air to meet these less stringent ventilation needs.

Additionally, in traditional architectures, galley chiller units and supplemental electronic equipment cooling units dump their waste heat to the inside air. The air conditioning system is thus indirectly required to service these heat loads via compressing additional outside air and ram air (drag). Consequently, the dumping of the waste heat into the cabin adversely impacts the amount of outside air required by the air conditioning system. According to the present invention, centralized temperature control systems, for galley chillers and supplemental electronic equipment cooling, offers a thermal management system which does not require compressing outside air.

Also, since the present invention provides supplemental cooling packs in addition to the traditional air conditioning packs, additional cooling capacity is available onboard in the event of a failure of the traditional air conditioning packs. Accordingly, the present invention improves aircraft level reliability and maintainability.

Furthermore, the peak loads associated with cargo air conditioning, electronic equipment cooling, and galley refrigeration typically occur while the aircraft is on the ground. Typically, the prior art air conditioning unit is sized for this condition. However, in some systems, various primary air conditioning unit components may be sized at the maximum certification altitude cruise condition. The present invention allows for the excess capacity of the supplemental cooling packs (sized for the ground case) available at cruise to be used for cabin cooling.

The fault tolerance and separation of cooling systems from the outside air compression system, provided by the present invention also eliminates the need for backup ventilation systems. By reducing the size of (or eliminating) these redundant systems the present invention reduces aircraft level power, air conditioning equipment size, weight, and drag and other penalties associated with the prior art.

According to other preferred embodiments of the present invention, centralized thermal management provides aircraft level power, air conditioning equipment size, weight, and drag benefits. These embodiments facilitate the incorporation of centralized aircraft thermal management systems using recirculation air (or another coolant which may be a liquid) and the air conditioning pack (or the supplemental cooling pack to service various temperature control needs. The system architectures provided by these embodiments offer maximum flexibility in meeting thermal management needs.

Referring now to FIG. 1, an aircraft air conditioning system 100 according to the present invention may be seen. At least three exemplary embodiments of the system 100 may be employed to efficiently ventilate the interior sections of the aircraft. Initially, though, to illustrate how reducing outside air compression provides the numerous benefits of the present invention, it will be assumed that the system 100 is operating in a mode wherein the recirculation lines are not operative, or are not installed in the system. Moreover, while valves or dampers may be desirable to prevent backflow and control the system 100, these valves have not been shown for clarity.

Starting where a quantity of outside air 2 enters the system 100 and following the path of the air through the system 100 to an inside air exhaust 83, the system 100 includes the following major components. First the outside air encounters a compressor 5, which compresses the outside air 2 to at least the pressure of the inside air 3. The compressor may be the engine compressor, an auxiliary power unit driven compressor, an electric compressor or other device. Since the compressor 5 compresses the outside air 2, the temperature of the outside air 2 increases markedly. It should be noted that the compression of the outside air from a fraction of atmospheric pressure (frequently as little as 2.7 psi, or less) to cabin pressure (preferably the equivalent of between 6000 and 8000 feet cabin altitude) requires a large amount of energy. Moreover, because of the thermodynamics of gas compression, much of that energy appears as heat in the compressed outside air 2.

To correct for the marked temperature increase, an outside air conditioning pack 15 cools the hot outside air 2 to below the lowest temperature needed for the temperature control demands of the aircraft. Once again, a large quantity of energy is required to cool the outside air 2 (e.g. ram air may be used as the coolant in the air conditioning pack 15). In the case of electrically driven or mechanically driven coolers (e.g. refrigeration systems), the energy is associated with driving the cooler.

In the case of an air cycle system, the energy is associated with providing a sufficient flow of ram air to cool the hot outside air. The net effect for an air cycle system is an increase in aircraft drag (i.e. wasted aircraft energy). The system at lower altitudes is energy demanding, whereas at higher altitudes (mainly at the certification altitude) the machine is still running but at a lower level. Though, even at these higher altitudes the machine still requires a high amount of energy to run. So, though the air cycle system is comparable to other systems (such as vapor cycle) at high altitude cruise, the air cycle system requires relatively more energy at lower altitudes.

At some point downstream of the compressor 5 recirculation air 6 will be mixed with the compressed outside air 2. That mixing may occur upstream of, downstream of, or within the air conditioning pack 15. Though, in practicality, the mixing is usually accomplished downstream of the air conditioning pack 15. The resulting air mixture is controlled to an appropriate temperature and dehumidified. The air mixture may also be deemed to be inside air 3. Even in the absence of recirculation air to mix with the outside air 2, the outside air 2 can be deemed inside air as a result of cooling in the air conditioning pack 15. Either way the mixed, or inside, air 3 flows through an inside air supply 25 to the first interior section 30.

The first interior section 30 may be one of several sections of the pressurized volume of the aircraft. These sections include the flight deck, cabin, crew rests, lavatories, and the galleys. Generally, the first section contains either the crew or passengers. Accordingly, the FAR/JAR regulations governing ventilation of the first section apply more stringent standards than for other sections of the pressurized volume. While circulating in and through the first interior section 30, the inside air 3 may absorb heat from a first object 35, thereby controlling the temperature of the first object 35. Moreover, the inside air 3 may also be entraining humidity from the first object 35 and other objects within the first interior section 30.

Returning now to the first object 35 (FIG. 1), the first object 35 may be one of a large variety of objects typically found in the first section 30 The types of objects which first object 35 may be are too numerous for practical mention herein, but are well known to those skilled in the art. The various objects which may be the first object 35 generally have a common need for the purposes of illustrating the present invention. The first object needs to be ventilated and perhaps temperature controlled or both.

The first object 35 may have further ventilation needs, such as odor removal (e.g. bio-effluence, galley odors, lavatory odors). More particularly the first object 35 may also include objects that produce heat, thereby needing cooling from the inside air 3. Further examples of first object 35 include electronic or mechanical equipment which dump heat to the inside air 3; passengers who need to have their body heat removed along with respiratory CO2 ventilated; and crew who in addition to those needs also must have any smoke attempting to intrude into the cockpit ventilated on a priority basis. Of course, the passengers also merit priority smoke exclusion from the cabin over other needs. Continuing now with the flow of air from the first section 30, a recirculation air return 40 draws the recirculation air 3 into itself via the current created by a recirculation air fan 45.

From the recirculation air fan 45, the recirculation air 4 flows through a recirculation air supplemental cooling unit 55. The supplemental cooling unit 55 may re-cool the recirculation air 4 for less stringent air conditioning needs (in particular temperature control needs) of a second object 75 in the second interior section 70. It should be noted that while energy is required to re-cool the recirculation air 4 (e.g. ram air may be used as the coolant in the supplemental cooling unit 55), no energy is required to either compress it or to remove the heat of compression from the recirculation air 4. Energy may also be saved if cabin exhaust air is used as the coolant in the supplemental cooling unit 55. Thus, the supplemental cooling unit saves energy as compared to the prior art which requires the compression of a separate quantity of outside air 2 for the air conditioning of second interior section 70.

Next, the now re-cooled recirculation inside air 4 flows through a re-cooled recirculation inside air supply 65 to the second interior section 70. The second interior section 70 may be the cargo bay of the aircraft, a galley chiller, or an electronic equipment rack. Once in the second interior section 70, the re-cooled recirculation air 4 ventilates or temperature controls the second object 75. In the alternative, the re-cooled recirculation air may perform both services for the second object 75. Thus, as illustrated, the system 100 air conditions the first section 30 and second section 70 in series, rather than in parallel. Between the first section 30 and the second section 70, the system 100 generally provides ventilation and temperature control to the entire pressurized volume of the aircraft. In particular, objects needing only temperature control may be supplied with recirculation air by recirculation air supply 65. In the alternative, these objects may be cooled by a centralized coolant loop to be discussed more fully herein.

Examining the second object 75 in more detail, the second object 75 may be one of a large variety of objects typically found in these second interior sections 70. Again, these objects are too numerous for practical mention herein, but are well known to those skilled in the art. The various objects which may be the second object 75 have a common characteristic though, typically they all have ventilation or temperature control needs less stringent than the air conditioning needs associated with the crew and passengers in the first interior section 30. In particular, the second object 75 may only have a temperature control need. For instance, the second object could be a perishable in the cargo bay.

As the recirculation air 4 absorbs yet more heat and humidity from these sources, the recirculation air 4 is pushed toward a recirculation air return 80, then through an inside air outflow valve 82, by the pressure differential between the pressurized volume and the outside air 2. As the inside air decompresses through the exhaust 83 some of the energy of compression, imparted to the air by the compressor 5 when the air was drawn inside, is lost. Though some of the energy is regained in the form of thrust acting on the aircraft at the exhaust 83. The net result is a loss of energy, as with the prior art. However, since the present invention provides a lessened need for make up air, and thus for exhaust air, the net loss is smaller. Accordingly, the present invention provides an energy savings.

By exhausting a portion of the recirculation air 4 (either from the first section 30 or the second section 70) more outside air 2 may be drawn in via the compressor 5 to ventilate and temperature control the pressurized volume by replenishing the inside air 3 already in the system 100. Thus, the compressor 5 makes up for the recirculation air 4 exhausted through the exhaust 83. Accordingly, a new quantity of outside air 2 flows through the system 100 as before, generally absorbing heat and entraining humidity as it flows through the system 100 from air conditioning pack 15 to exhaust 83.

Three exemplary embodiments, to be discussed now, include recirculation loops. As will be described with reference to FIG. 1, these embodiments vary the location where a recirculation loop returns the recirculation air 6 to the flow through embodiment. These embodiments may also vary the location of where the recirculation loop draws the recirculation air 6 from the flow through embodiment.

One of these recirculation draws may occur at a recirculation air return 125 located so as to return air from the first interior section 30. The inside air 3, now as recirculation air 6, flows from the recirculation air return 125 through a recirculation air fan 130 and then to the recirculation duct or header 90. Note that this recirculation draw occurs upstream of the supplemental cooling unit 55. Another recirculation draw may occur downstream of the recirculation inside air supplemental cooling unit 55 where a re-cooled recirculation fan 88 draws the re-cooled recirculation air 4 into the recirculation duct 90.

From the recirculation duct 90, the recirculation air 6 may be returned to upstream points in the system 100 for mixing with outside air 2 and subsequent reuse without compression. For instance, outside air mixing manifold 10 may allow an upstream return point for the recirculation air 6. In the hot outside air mixing manifold 10 the hot outside air 2 mixes with the recirculation air 6. Here, the recirculation air 6 may be cooler than the hot outside air 2 despite being warm from absorbing heat in the first interior section 30.

In the alternative, the recirculation air 6 may be returned at a cooled outside air mixing manifold 20. Since the recirculation air 6 reduces the required flow of make up outside air 2, the energy consumed in compressing the outside air 2 and then cooling it, is minimized. An inside air bypass line 110, which draws off cooled inside air 3 downstream of the recirculation air 6 return, may also be included in the system 100. In this embodiment, bypass line 110 feeds inside air 3 (including some recirculation air 6 in the mixture) directly to the second interior section 70, via an inside air bypass supply 120.

Thus the components of the system 100 have been described. Turning now to the exemplary embodiments of the system 100 which include recirculation loops, it will be seen that the overall system can be selectively designed with fewer than all of these components. Yet these embodiments, shown in FIGS. 2 to 4, reduce the energy and weight required to ventilate the aircraft.

Figure 2:
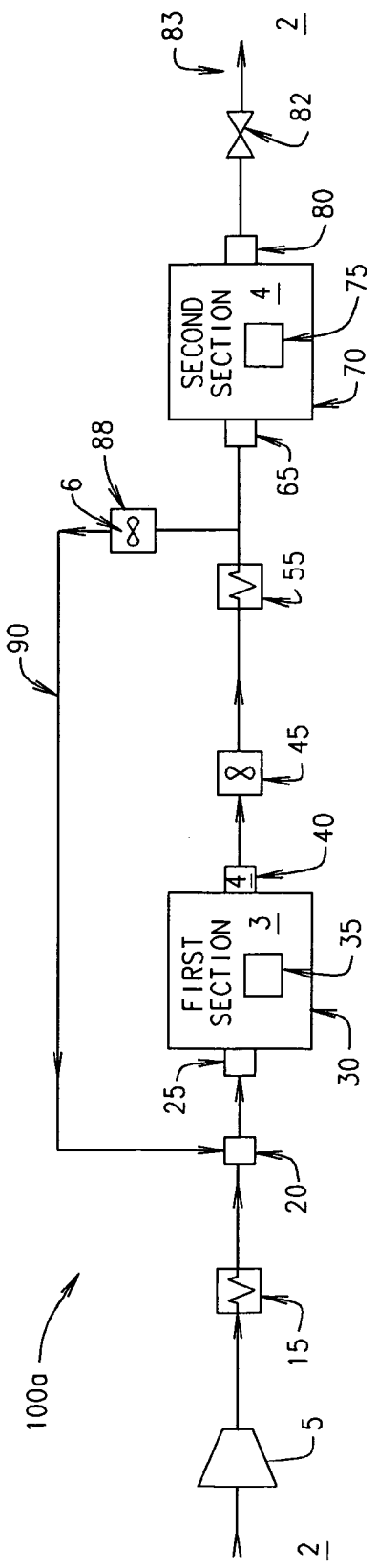

Turning now to FIG. 2, a first exemplary embodiment, the outside air 2 again enters a system 100a through the compressor 5. It flows all the way through the system 100a to the inside air exhaust 83 in a manner similar to that described for the flow through embodiment. However, a recirculation loop is provided via the re-cooled recirculation air fan 88, recirculation duct 90, and cooled outside air mixing manifold 20. Thus, re-cooled recirculation air 4 is recirculated from the supplemental cooling unit 55 to just downstream from the air conditioning pack 15.

Accordingly, system 100a reduces the size, weight, drag, and energy consumption of the aircraft in general. Moreover, first object 35 receives conditioned inside air 3 from the mixing of recirculated and re-cooled recirculation air 4 and cooled outside air 2. In contrast, the second object 75 receives re-cooled recirculation air from the supplemental cooling unit 55. In summary, the system 100a provides a recirculation path around the loop including the first interior section 30, recirculation air supplemental cooling unit 55, recirculation duct 90, and cooled outside air mixing manifold 20.

A second exemplary embodiment may be seen in FIG. 3. One of the significant differences between system 100a (FIG. 2) and a system 100b (FIG. 3) is the point at which the recirculation air 6 returns. In system 100b, the recirculated air returns at the outside air mixing manifold 10 rather than the cooled outside air mixing manifold 20. As in the system 100a, the recirculation air 6 is drawn off with the re-cooled recirculation air fan 88. Thus, the system 100b reduces the energy consumption of the aircraft by re-cooling recirculation air. In summary, the system 100b provides a recirculation loop including the first interior section 30, recirculation air supplemental cooling unit 55, recirculation duct 90, and hot outside air mixing manifold 10.

A system 100c in accordance with a third exemplary embodiment may be seen in FIG. 4. One of the significant differences between system 100a (FIG. 2) and system 100c (FIG. 4) is the point at which the recirculation air 6 returns. In system 100c the recirculation air 6 returns via cooled outside air tee 17. Also, in system 100c the recirculation draw is accomplished via the re-cooled recirculation air recirculation fan 88. Thus, the system 100c also reduces the flow through the air conditioning pack 15 and accordingly reduces the aircraft level power, air conditioning equipment size, weight, and drag. In summary, the system 100c provides a recirculation loop including the first interior section 30, the recirculation air supplemental cooling unit 55, recirculation duct 90, and cooled outside air tee 17.

Whether the air conditioning pack 15 or the recirculation air supplemental cooling unit 55 serves the re-cooling function, one or both may also serve to cool a temperature control coolant other such as the recirculation air 4. For example, either air conditioning pack 15 or supplemental cooling unit 55 may couple to a propylene glycol, water, polyalphaolefin, Galden®, or H-Galden® (available from Solvay Solexis, Inc. of Thorofare, N.J.) loop to provide a centralized cooling, or thermal management, system. Thus, objects onboard the aircraft which would otherwise dump their heat to the inside air 3 (or secondary air 4) may instead be coupled to the centralized coolant loop. In the alternative, the central coolant loop, and associated cooling units may be used to re-cool recirculation air (as in the systems 100a, 100b, or 100c). Thus the temperature control demand on the system 100a, 100b, or 100c for outside air may be reduced by the centralized coolant loop. Accordingly, the various embodiments described herein will reduce aircraft level power, air conditioning equipment size, weight, and drag.

While, the air conditioning packs have been described as air cycle heat exchangers, the present invention is in no way limited to air cycle systems. The systems and devices provided by the present invention, in particular, may be vapor cycle systems and components where appropriate. Moreover, the present invention is not limited by where the recirculation air returns to the air flow through the air conditioning system. Nor is the present invention limited by how the recirculation air and compressed outside air mix to form inside air. For instance, systems in accordance with the present invention may include the mixing devices described in co-owned U.S. Pat. No. 6,401,473, issued to Ng et al and incorporated as if set forth in its entirety herein.

Turning now to FIGS. 6 to 9, four more exemplary embodiments of the present invention are shown. These four preferred embodiments offer flexibility, while providing the advantages of the present invention. The specific application of each embodiment may depend on spatial integration considerations (for example, equipment installation envelope limitations, proximity to recirculation air sources and users, proximity to coolant users, proximity to ram air circuits, etc.), the cooling pack cycle chosen, and/or other airplane or system specific requirements. Note that systems 510, 610, 710, and 810 generally employ pairs of similar equipment as shown in FIGS. 6 to 9. Though, only one set of equipment will be discussed herein, with reference to one set being understood to refer to the other set.

Figure 6:
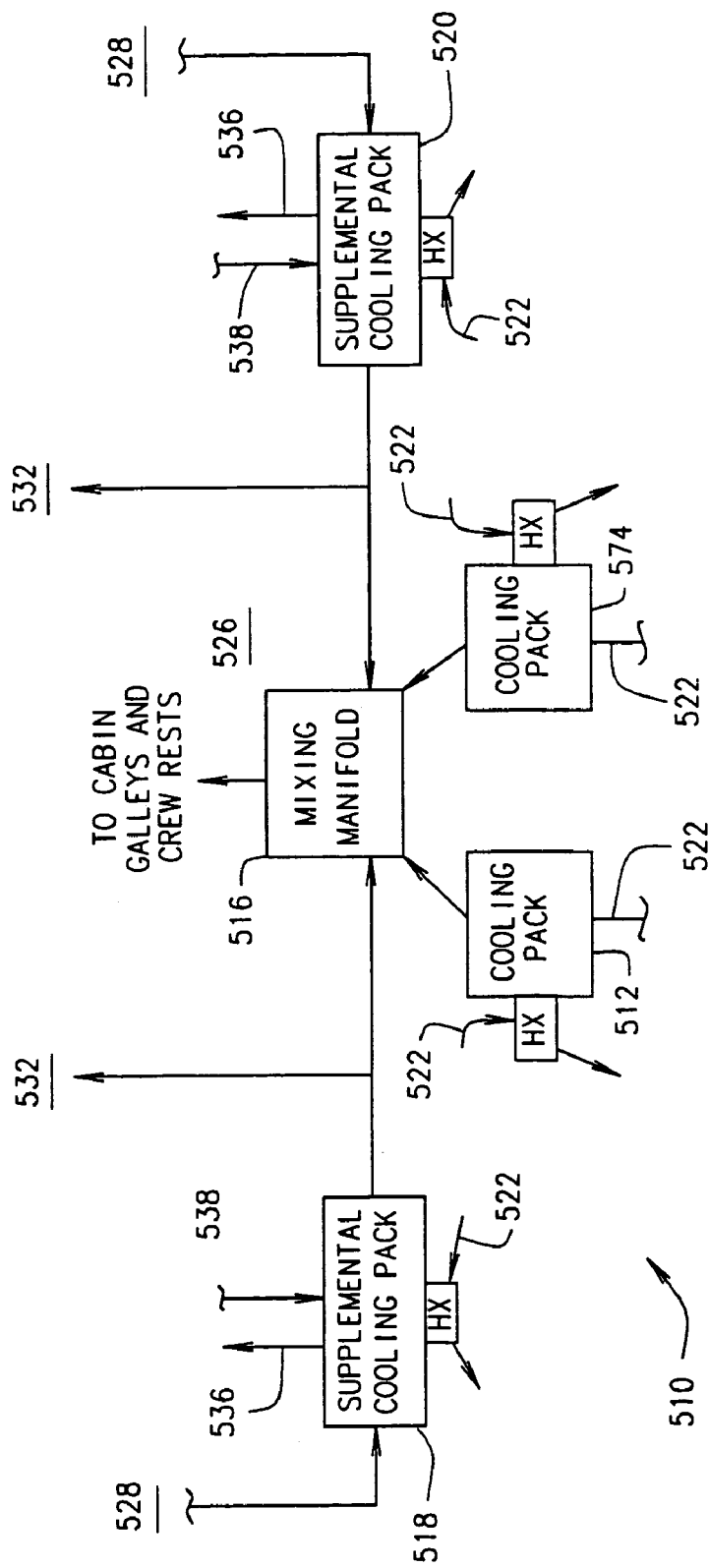
FIG. 6 is a schematic view of an aircraft air conditioning system according to a preferred embodiment of the present invention.

Referring now to FIG. 6 in particular, a preferred embodiment of an aircraft air conditioning system 510 in accordance with the present invention may be seen. The system 510 includes a pair of cooling packs 512 and 514, a single mixing manifold 516, and a pair of supplemental cooling packs 518 and 520. Outside air 522 from the engine, APU bleed, electrically or shaft driven compressors or any other compression device (not shown) flows through the cooling packs 512, 514. Once through the cooling packs 512, 514, the outside air 522 is at a temperature below the lowest temperature required by the temperature control demands of the pressurized volume of the aircraft.

The outside air 522 flows into the mixing manifold 516 where it mixes with recirculation air 528. From the mixing manifold 516 mixed air, or inside air 526, flows to the cabin, galleys and crew rests. Recirculation air 528 returns via the supplemental cooling pack 518, wherein the recirculation air 528 is re-cooled for further use. Such further use includes return to the cabin, via the mixing manifold 516 for ventilation and temperature control. Additionally, a portion of the recirculation air 528 may be drawn off as recirculation air 532 for temperature control of the galley chillers, electronic equipment, pack bay, and cargo. Note that, by using the recirculation air 532 instead of drawing in additional outside air 522, this gives rise to the aircraft level energy savings and other benefits provided by the present invention.

In addition, a centralized coolant loop 536 may be seen connected to the supplemental cooling pack 518. As an alternate to providing temperature control via recirculation air 532, the centralized coolant loop 536 may be employed. Thus, temperature control of the galley chillers, electronic equipment, pack bay, and cargo and supplemental cabin cooling and recirculation chilling may be accomplished without drawing in and compressing outside air 522.

Figure 7:
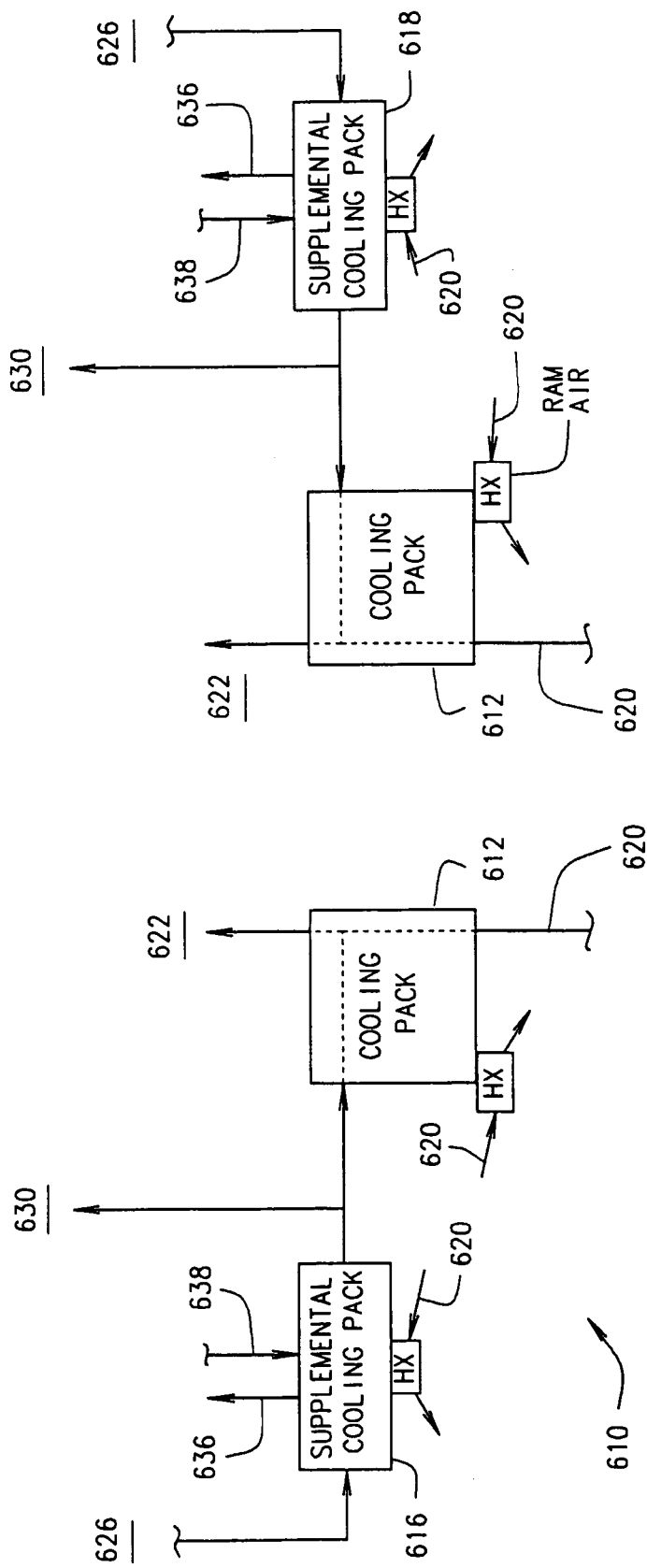
FIG. 7 is a schematic view of an aircraft air conditioning system according to a preferred embodiment of the present invention.

Similarly, aircraft air conditioning system 610 accomplishes temperature control functions without drawing in and compressing outside air as shown in FIG. 7. The system 610 includes a cooling pack 612 and a supplemental cooling pack 616. Outside air 620 flows through the cooling pack 612 wherein it is mixed with recirculation air 626 and cooled to form inside air 622. The inside air 622 is fed to the cabin, galleys, and crew rests to satisfy ventilation and temperature control needs. Whereupon the air returns as recirculation air 626 to the supplemental cooling pack 616. In the supplemental cooling pack 616 the recirculation air 626 is re-cooled and may be directed back to the cabin for further ventilation and temperature control as shown.

In the alternative, a portion of the recirculation air 626 may be directed to devices requiring temperature control only. Such temperature control dedicated recirculation air 630 satisfies the temperature control needs of the galley chillers, electronic equipment, pack bay, and cargo. Another alternative allows the use of a centralized coolant loop 636 to satisfy the various temperature control needs. As with the other centralized coolant loops, the centralized coolant loop 636 may employ any commercially available coolant suitable for use in the pressurized volume of the aircraft. Thus, as with the other system architectures provided by the present invention, system 610 provides temperature control functions independent of the need to draw in and compress outside air.

Figure 8:
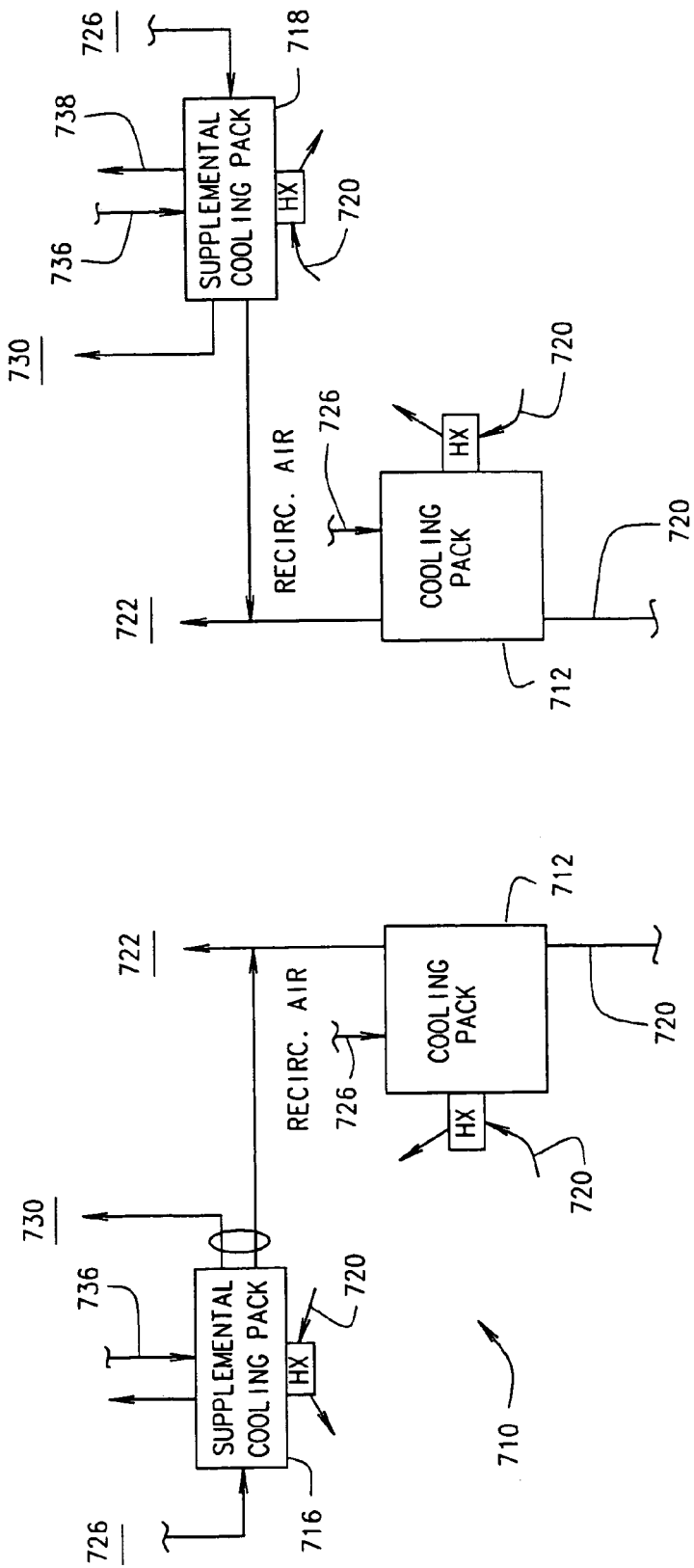
FIG. 8 is a schematic view of an aircraft air conditioning system according to a preferred embodiment of the present invention.

Another preferred embodiment in accordance with the present invention may be seen as system 710 in FIG. 8. The system 710 also includes a cooling pack 712 and a supplemental cooling pack 716. Outside air 720 is cooled by the cooling pack 712 and mixed with recirculation air 726 as shown. The mixed air, or inside air 722, flows to the cabin, galleys, and crew rests to satisfy ventilation and temperature control needs. Additionally, a portion of the recirculation air 730 may be drawn off from the supplemental cooling pack 716 to satisfy only temperature control needs similar to those already discussed. Thus system 710 also provides the energy savings of the present invention by eliminating the need to draw in and compress outside air 720 to satisfy temperature control needs. Of course, the system 710 (as with other embodiments of the present invention) may include a centralized coolant loop 736.

FIG. 9 shows another preferred embodiment of the present invention. A system 810 centralizes the equipment necessary to provide temperature control and ventilation within the envelope of the cooling pack 812. However, as with the other architectures herein provided, the temperature control function remains independent from the need to draw in and compress outside air, and remains functionally separate from the ventilation function.

In system 810, outside air 816 flows into the cooling pack 812 where it is mixed with recirculation air 822. From the cooling pack 812, the mixed, or inside air 818, may flow to the cabin, galleys, and crew rests to satisfy ventilation and temperature control needs. From the cabin and other areas, the inside air 818 returns as recirculation air 822. The recirculation air 822 is cooled by the cooling pack 812. After being cooled, the recirculation 822 air may be mixed with outside air 816 and fed to the cabin, as before, or a portion of the recirculation air 826 may be drawn off for temperature control of the galley chillers, electronic equipment, pack bay, and cargo.

System 810 may also include a centralized coolant loop 830 to provide temperature control of the galley chillers, electronic equipment, pack bay, and cargo and for supplemental cabin cooling and recirculation chilling. Thus, as shown, system 810 separates the temperature control function from the ventilation function. System 810 also provides the temperature control function independent of the need to draw in and compress outside air 816.

Figure 5:
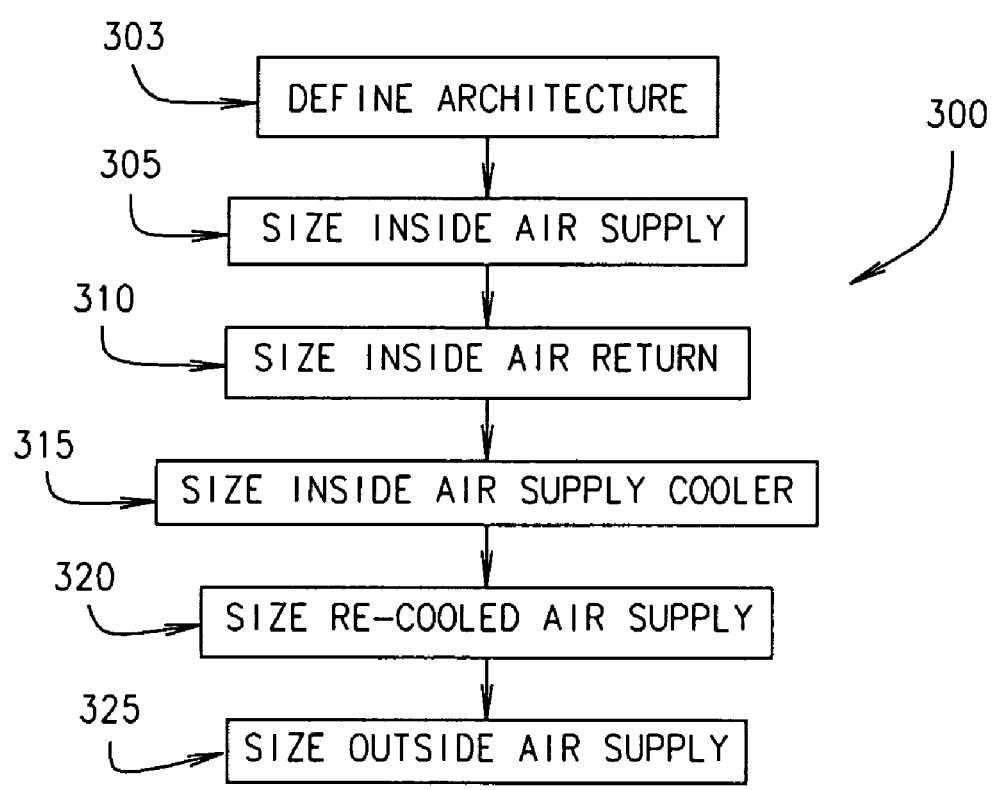
FIG. 5 is a flowchart of a method of designing an aircraft air conditioning system in accordance with the present invention.

Regardless of the system or cooler selected, the sizing of the various components should be interrelated to optimize the aircraft level power, air conditioning equipment size, weight, and drag in accordance with the principles of the present invention. Accordingly, the present invention also provides a method 300 to so interrelate the sizing of the various components, as can be seen with reference to FIG. 5. Note that when sizing the systems in accordance with the principles of the present invention, the availability of heat sinks and the flow of air exhausted from the first object 35 to the second object 75 (see FIGS. 1 to 4) are considerations the system designer may employ to reduce the size and weight of the components of the system.

In step 303 the system architecture is defined and includes either a supplemental cooling unit or a central coolant loop, or both. The inclusion of one, or more, of these devices in accordance with the present invention allows the temperature control needs of the various objects in the pressurized volume to be satisfied with a lessened need for compressed outside air. Next, in step 305 is to size the inside air supply for the first object which has the most stringent ventilation need and perhaps a temperature control need. Notably, the inside air supply size will be in part determined, indeed reduced, by the presence of the supplemental cooling unit(s) and central coolant loops in the various architectures provided by the present invention.

Then the recirculation air return for the first object should be sized in step 310. In step 315, the supplemental cooling unit is sized. Primary considerations in sizing the supplemental cooling unit are the air conditioning needs of the first object and the temperature control need (and perhaps a ventilation need) of the second object. Notably, the temperature of the air at the return depends on the first object ventilation rate and the heat transferred between the first object and the air. Thus, the air conditioning need of the first object helps define the inlet conditions for the supplemental cooling unit. In contrast, the ventilation and temperature control needs of the second object helps define the required outlet conditions at the supplemental cooling unit exit. Accordingly, the supplemental cooling unit size depends on the ventilation needs of both the first and the second objects.

In step 320, the re-cooled air supply (i.e. the recirculation air supply 65) for the second object is sized. Finally, the outside air supply (e.g. the compressor) is sized in step 325. In sizing the outside air supply, consideration is given to the advantage of the supplemental cooling units and central coolant loops in reducing the need for outside air. Thus, the outside air supply is smaller in terms of flow rate and energy requirement than architectures provided by the prior art. While the method 300 has been described as a sequence of steps, those skilled in the art will recognize that the order of the steps may not be fixed. In particular, systems may be sized by iterating the various steps of the method 300 without departing from the spirit or scope of the present invention.

As will be appreciated by those skilled in the art, the transitions between the various types of air (outside air 2, inside air 3, and recirculation air 6) vary according to the embodiment and the context in which each transition is discussed. Thus, the specific transitions discussed herein should not be construed to limit the spirit or scope of the invention. In particular, inside air 3 and recirculation air 6 tend to coexist in the sections of the pressurized volume to which inside air 3 is typically supplied. Once the air is drawn toward, or enters, a recirculation return, it may then typically be deemed recirculation air 6.

Figure 10:
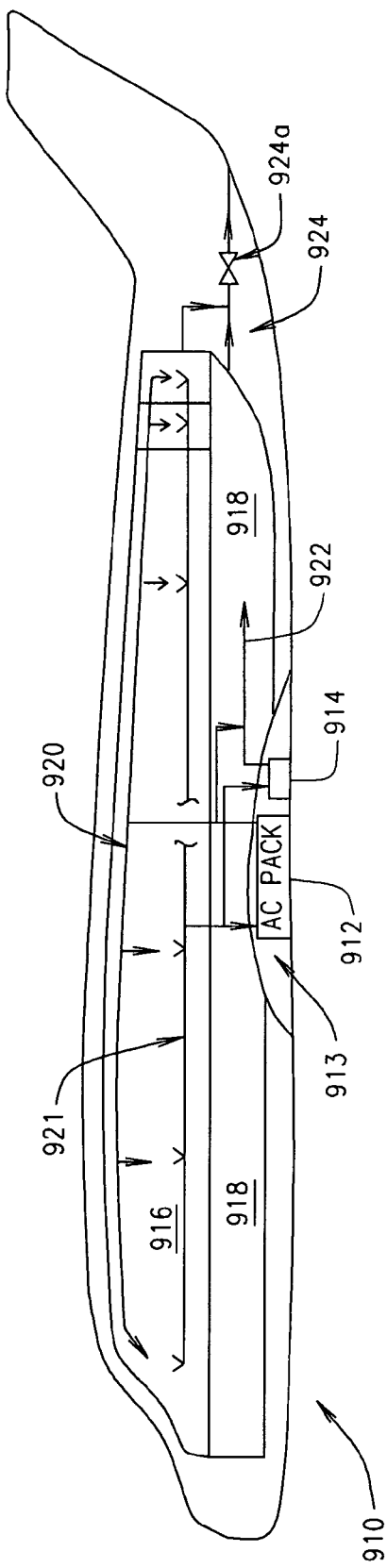
FIG. 10 is a side view of an aircraft air conditioning system according to a preferred embodiment of the present invention.
Figure 11:
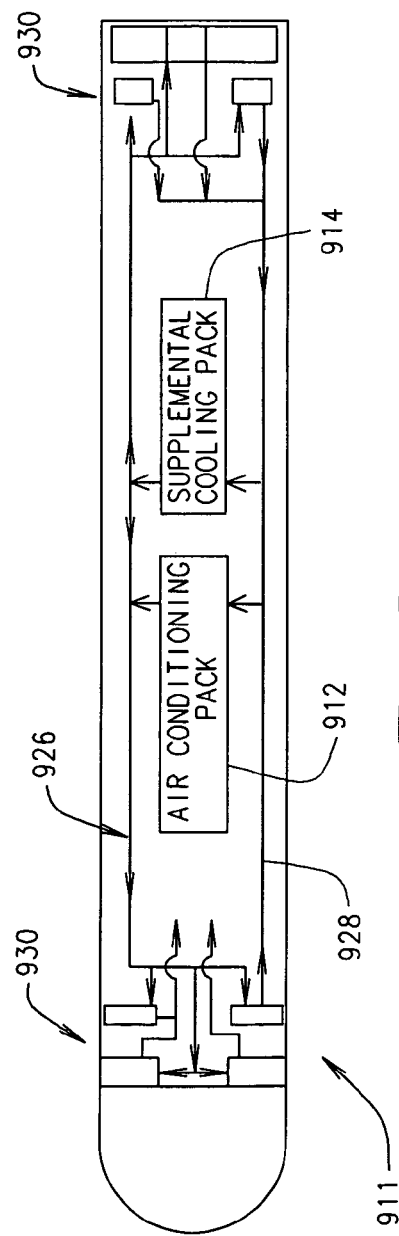
FIG. 11 is a top view of an aircraft thermal conditioning system according to a preferred embodiment of the present invention.

Since the criticality of supplemental electronic equipment cooling may be higher than other functions such as cabin temperature control and ventilation, the present invention (as shown in FIGS. 10 and 11) allows for the functional separation of the equipment and systems related to these two functions. A system 910 includes an air conditioning pack 912, a supplemental cooling pack 914, an air distribution duct 920, a recirculation air duct (or airway) 921, a recirculation air duct 922, and an overboard exhaust duct 924 (and valve) 924*a*. Note that the positioning of the various pieces of equipment included in system 910 may be altered without departing from the spirit or scope of the present invention. The system 910 provides ventilation of, and separately temperature control of, the pressurized volume of the aircraft. Generally, the pressurized volume includes a cabin 916 and a cargo bay 918.

A source of pressurized outside air (not shown) provides make up outside air to the system 910. The hot, pressurized, outside air is cooled by the air conditioning pack 912 using ram air 913. It may be mixed with recirculation air as discussed herein. The resulting inside air may flow into the air distribution duct 920 to ventilate and temperature control the cabin 916. The system 910 may exhaust, or discard, some inside air via the exhaust duct 924. Instead, the air recirculation duct 921 may collect the recirculation air, which would otherwise be discarded, from the cabin 916.

The air recirculation duct 921 may return the collected recirculation air to the air conditioning pack 912 or direct it to the supplemental cooling pack 914. Either, or both, of the cooling packs 912 and 914 may re-cool the recirculation air. From either cooling pack 912 or 914 the recirculation air duct 922 may draw off a portion of recirculation air for temperature control only of selected objects or sections of the pressurized volume. In FIG. 10, the recirculation air duct 922 is shown as controlling the temperature of the cargo bay 918.

Additionally, system 910 may include a centralized coolant loop 911 as shown in FIG. 11. The centralized coolant loop may utilize either, or both, of the air conditioning pack 912 and the supplemental cooling pack 914. The cooling packs 912 and 914 cool coolant flowing into a coolant distribution header 926. Various pieces of equipment 930 may connect to the coolant distribution header 926 to be cooled by the coolant. In particular electronic equipment may be connected to the distribution header 926 to satisfy critical cooling needs. A coolant return header 928 collects the warmed coolant and returns it to one or more of the coolers 912 and 914 to be re-cooled.

The supplemental cooling units (which service the central galley chiller, supplemental electronic equipment cooing, cargo air condition, etc.) discussed herein will likely be sized to service the ground operation case. They may also be oversized to address system fault tolerance requirements. Consequently, they will likely have extra cooling capacity available during high altitude cruise. Using their extra capacity for supplemental cabin cooling via chilled, or re-cooled, recirculation air reduces the cooling demand required from the main cooling packs. The reduction translates to lower aircraft level air conditioning weight, size, power, and drag. This is particularly true if the main cooling packs are an air cycle system, if turbine expansion cooling beyond the ram sink temperature is required, and if they are used in conjunction with a no bleed air cycle air conditioning systems (for example, a system which uses electric driven compressors to supply outside air). The present invention thus provides this beneficial system integration concept. Moreover, it will be understood by those skilled in the art that the present invention provides highly efficient air conditioning system architectures regardless of the type of cooling system, or systems, employed to chill the air and other coolants in the systems.

The use of central unit(s) to provide cooling for the galley chillers, electronic equipment, and cargo bay may offer a weight and efficiency advantage over the traditional architectures which utilize many individual units for these tasks. In doing so, the aircraft thermal loads can be reduced, therefore minimizing aircraft level weight, drag, and power extraction. As can be seen in FIGS. 10 to 11, this invention facilitates the use of central chilling units for galley chillers, supplemental electronic equipment cooling, and other purely temperature control needs.

Thus it has been demonstrated that the present invention provides numerous advantages over the prior art. For instance, the supplemental cabin cooling functionality may only require ground electrical power, eliminating the need to run the APU. Since the APU is a gas turbine, this results in noise and air pollutant emissions. Therefore, the cabin can be conditioned while at the gate or on the ground for maintenance without APU noise and air pollutant emissions. Accordingly APU noise and air pollutant may be reduced as well.

Note also that the outside air supply may be considerably smaller, lighter, and require less energy as a result of the re-cooling and re-use of recirculation air as provided by the present invention. These benefits accrue because the make up flow rate of outside air is reduced by the present invention. Moreover, by minimizing the need for outside air the present invention reduces the amount of ram air drag.

Requirements stemming from FAR 25.1309 and FAR 25.831(g) at Amendment 25–87 require that the cabin and crew compartments be maintained below intolerable temperature and humidity thresholds. These requirements are particularly challenging when all conditioned air inflow is lost. Consequently, backup ventilation systems have been implemented in some recent aircraft designs. Since this invention provides supplemental cabin cooling via chilled recirculation air, further cabin cooling redundancy results. Consequently, the backup ventilation systems recently added to many aircraft may no longer be necessary (or may be reduced in size) to address these requirements.

The description of the invention is merely exemplary in nature and, thus, variations obvious to those skilled in the art are not to be regarded as a departure from the spirit and scope of the invention.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A mobile platform, comprising:
   a volume adapted to contain a first, a second, and a third object;
   a primary air conditioning system adapted to compress and cool a quantity of outside air, the air conditioning system further adapted to pressurize the volume therewith so that the quantity of outside air becomes a quantity of inside air, the air conditioning system further adapted to ventilate the first object with the quantity of inside air;
   an exhaust adapted to exhaust a portion of the quantity of inside air; and
   a cooler adapted to cool the portion of the quantity of inside air and to use the portion of the quantity of inside air to cool the second and third objects.

2. The mobile platform according to claim 1, the first object being a passenger.

3. The mobile platform according to claim 1, the second object to be selected from the group consisting of a cargo compartment, a component of electronic equipment, and a galley refrigerator.

4. The mobile platform according to claim 1, the cooler comprising a coolant selected from the group consisting of polyalphaolefin, propylene glycol, and water.

5. The mobile platform according to claim 1, the primary air conditioning system further comprising an air cycle system and a turbine expander.

6. An aircraft, comprising:
   an internal volume adapted to contain a plurality of heat generating loads;
   a compressor adapted to compress outside air;
   a cooler adapted to cool the compressed outside air to turn the cooled compressed outside air into inside air, the inside air adapted to pressurize the volume;
   a centralized thermal management system, the thermal management system adapted to provide the inside air to a first one of the plurality of heat generating loads, the thermal management system further adapted to exhaust a portion of the inside air from the first heat generating load, cool the portion of the inside air, and supply the portion of the inside air to at least a second one of the plurality of heat generating loads to control the temperature of the second heat generating load, the temperature of the second heat generating load being controlled solely by the portion of the inside air.

7. The aircraft according to claim 6, the volume further adapted to contain a passenger, the centralized thermal management system adapted to ventilate the passenger with the inside air.

8. The aircraft according to claim 6, the plurality of heat generating loads to include one of a piece of cargo, a piece of electronic equipment, and a galley refrigerator.

9. The aircraft according to claim 6, the centralized thermal management system comprising a coolant selected from the group consisting of polyalphaolefin, propylene glycol, and water.

10. The aircraft according to claim 6, the cooler further comprising an air cycle system and a turbine expander.

11. A method of managing thermal loads on an aircraft comprising:
    compressing a quantity of outside air;
    cooling the quantity of outside air to form a quantity of inside air;
    ventilating a first object in a pressurized volume of the aircraft with the quantity of inside air;
    exhausting a portion of the quantity of inside air from the first object;
    cooling the portion of the quantity of inside air; and
    cooling a second object in the pressurized volume solely with the portion of the quantity of inside air.

12. The method according to claim 11, the first object comprising a passenger.

13. The method according to claim 11, wherein the second object is selected from the group consisting of a cargo compartment, a piece of electronic equipment, and a galley refrigerator.

14. The method according to claim 11, wherein the portion of the quantity of inside air is cooled with a coolant selected from the group consisting of polyalphaolefin, propylene glycol, and water.

15. The method according to claim 11, the cooling of the quantity of outside air to further comprise:
    using ram air to cool the quantity of outside air; and
    expanding the quantity of outside air.

16. A method of designing an aircraft air conditioning system comprising:
    including an outside air supply and a supplemental cooling unit in an architecture of the aircraft air conditioning system;
    designing the outside air supply to compress outside air to form a quantity of inside air that pressurizes a volume within the aircraft and ventilates a first portion of the pressurized volume;
    designing the supplemental cooling unit to exhaust a portion of the inside air away from the first portion of the pressurized volume and control the temperature of an object in a second portion of the pressurized volume of the aircraft, the temperature of the object being controlled solely with the portion of the inside air exhausted away from the first portion of the pressurized volume; and sizing the outside air supply based upon the including of the supplemental cooling unit in the aircraft air conditioning system architecture and further based upon using the exhausted portion of the inside air to control the temperature of the object in the second portion of the pressurized volume of the aircraft.

17. The method according to claim 16, further comprising including an inside air recirculation line to the supplemental cooling unit to enable the supplemental cooling unit to control the temperature of the object in the second portion of the pressurized volume with the recirculation air.

18. The method according to claim 16, further comprising including a central coolant loop to the supplemental cooling unit to enable the supplemental cooling unit to control the temperature of the object in the pressurized volume with a coolant of the central coolant loop.

19. A mobile platform comprising:
   a cabin area;
   a primary air conditioning system adapted to compress and cool a first quantity of air drawn from outside the mobile platform, to create a second quantity of air, and to pressurize said cabin area with said second quantity of air;
   a supplemental cooling system for cooling a specific subsystem on said mobile platform other than said cabin area;
   an exhaust component adapted to exhaust a portion of said second quantity of air from said cabin area: and
   the supplemental cooling system adapted to receive said portion of said second quantity of air exhausted from said cabin and to cool said portion to create a third quantity of air, and to circulate said third quantity of air back into said cabin area to mix with said second quantity of air and to assist in cooling said cabin area.

20. A method for cooling an interior cabin area of a mobile platform, comprising:
   using a primary air conditioning system to compress and cool a first quantity of air drawn from outside the mobile platform, to create a second quantity of air;
   pressurizing said cabin area with said second quantity of air;
   exhausting a portion of said second quantity of air from said cabin area to a supplemental cooling system, in which the supplemental cooling system is primarily responsible for cooling a portion of said mobile platform other than said cabin area;
   using the supplemental cooling system to cool said portion of said second quantity of air to create a third quantity of air; and
   circulating said third quantity of air back into said cabin area to mix with said second quantity of air and to assist in cooling said cabin area.

* * * * *